(12) United States Patent
Bartstra

(10) Patent No.: US 7,523,005 B2
(45) Date of Patent: Apr. 21, 2009

(54) CLAMP-ON CORIOLIS MASS FLOW METER USING IN-SITU CALIBRATION

(75) Inventor: Rolf Willem Bartstra, Rotterdam (NL)

(73) Assignee: Nederlandse Organisatie voor toegepast-natuurwetenschappelijk Onderzock TNO, Delft (NL)

( * ) Notice: Subject to any disclaimer, the term of this patent is extended or adjusted under 35 U.S.C. 154(b) by 118 days.

(21) Appl. No.: 10/556,626

(22) PCT Filed: May 11, 2004

(86) PCT No.: PCT/NL2004/000316

§ 371 (c)(1),
(2), (4) Date: Oct. 20, 2006

(87) PCT Pub. No.: WO2004/099734

PCT Pub. Date: Nov. 18, 2004

(65) Prior Publication Data

US 2007/0119262 A1    May 31, 2007

(30) Foreign Application Priority Data

May 12, 2003 (NL) ................................. 1023395

(51) Int. Cl.
*G01F 1/00* (2006.01)
(52) U.S. Cl. ....................................................... 702/45
(58) Field of Classification Search .................... 702/45
See application file for complete search history.

(56) References Cited

U.S. PATENT DOCUMENTS

| 5,321,991 A | 6/1994 | Kalotay |
| 6,199,022 B1 * | 3/2001 | Cunningham ................ 702/54 |
| 6,272,438 B1 | 8/2001 | Cunningham et al. |
| 6,412,354 B1 * | 7/2002 | Birchak et al. ......... 73/861.356 |
| 6,704,666 B2 * | 3/2004 | Normen ....................... 702/45 |

FOREIGN PATENT DOCUMENTS

WO    WO 03/021205 A1    3/2003

OTHER PUBLICATIONS

International Search Report.

* cited by examiner

*Primary Examiner*—Tung S Lau
*Assistant Examiner*—Aditya Bhat
(74) *Attorney, Agent, or Firm*—Watson I.P. Group, PLC; Jovan N. Jovanovic; Vladan M. Vasiljevic

(57) ABSTRACT

With a Coriolis mass flow meter a mass flow through a pipe is determined by exerting a force and/or moment on at least one location on the pipe, such that vibrations of several vibration modes are excited. The magnitude is determined of the force and/or the moment with which the pipe is excited. The response of the pipe is measured at multiple locations between two clamping points of the pipes, at excitations with several different frequencies. The sensitivity of the response to the mass flow is calculated on the basis of a model which comprises as free parameters the mass flow and model parameters which determine the sensitivity, wherein the mass flow and the model parameters are estimated that correspond with the combination of the force and/or the moment and the response measured for the different frequencies.

14 Claims, 3 Drawing Sheets

CLAMP-ON CORIOLIS MASS FLOW METER USING IN-SITU CALIBRATION

FIELD OF THE INVENTION

The invention relates to a Coriolis mass flow meter and to a method for measuring the magnitude of a mass flow through a pipe.

BACKGROUND

U.S. Pat. No. 5,321,991 describes a clamp-on Coriolis mass flow meter. Patent WO 03/021205 describes a calibration method for Coriolis mass flow meters. A Coriolis mass flow meter makes use of the transverse forces that are generated in a flowing liquid if the pipe is subject to vibrations transverse to the direction of flow. When the liquid flows through a pipe that is vibrated transversely to the axial direction of the pipe, then an imaginary slice of the liquid in a transverse cross section of the pipe exerts a Coriolis transverse force on the pipe which is strictly linearly proportional to the total mass flow of that segment. By measuring the resultant effect on the deflection of the pipe, a measurement is obtained that is a measure for the mass flow.

The prior art makes use of a vibration model in terms of vibration modes. The vibration model assumes that a clamped pipe has a number of vibration modes (labeled with an index "m"), in each of which the pipe, if the mass flow was zero in the absence of excitation, could vibrate, damped, with a deflection transverse to the pipe of $$u_m(x,t) = C(t) s_m(x)$$

The x dependency sm(x) of this vibration for a particular mode m is called the mode shape. What is specific about this model is that in a vibration mode there is a time-independent proportion factor between the deflection at different positions x.

The mode shape is generally dependent on the properties of pipe 10 and its clamping.

The vibration frequencies of the different modes determine the resonance frequencies of the pipe. When the pipe is deflected with a time periodic signal $\exp(i\omega t)$ of a frequency at or near the resonance frequency of a particular mode, the deflections u(x,t) of the pipe are mainly determined by the mode shape sm(x) of the respective mode:

$$u(x,t) = B_m s_m(x) \exp(i\omega t)$$

In the absence of a mass flow and at minor damping, the deflections u(x,t) in this single mode at all positions x are in phase. In the presence of a mass flow Q, a place-dependent transverse force Fc on the pipe arises $$Fc = 2Q\, d^2u/dxdt$$

This force causes a coupling between the modes, as a result of which deviations arise between the deflection u(x,t) and the shape of the resonant mode shape, having the shape of the mode shapes of other modes.

In the prior art, the mass flow Q is measured by vibrating the pipe at the frequency of a particular mode and subsequently measuring the amplitude of the deflections of the pipe at points where in the absence of mass flow nodes in the vibration of the respective mode would occur. The measured vibration amplitude is thus a measure for the mass flow Q.

The deviations of the resonant mode are approximately ninety degrees out of phase with the resonant mode itself. This is sometimes also made use of in measuring the mass flow Q, for instance by measuring the phase differences of the zero-axis crossings at two different positions on the pipe, which are the result of the excitation of the resonant mode and non-resonant modes.

Both kinds of measurements are relative, in the sense that changes in the mass flow Q can be measured with them, but one or more calibration factors are needed to be able to measure the mass flow in an absolute sense. The calibration factors depend on the specific properties of the pipe, which are often dependent on external influences such as the temperature. In the case of "inline" Coriolis mass flow meters, which are fabricated pipe-and-all and are later installed in a pipe system, the calibration factors can already be determined before mounting. In clamp-on Coriolis flow meters which are mounted externally on pipes of an existing pipe system, the calibration factors can only be determined after mounting.

Normally, the calibration factors are determined empirically, by measuring the response at at least two different given mass flows of known flow strength. By virtue of the strict linearity, the meter is thus fully calibrated. WO03/021205 describes how a calibration factor can be calculated on the basis of modal mass, damping and stiffness parameters and mode shapes such as these can be determined with the aid of standard modal analysis techniques. Thus, the mass flow meter can also be calibrated if it is not possible to provide two different mass flows of known flow strength. It suffices in the absence of mass flow to measure information about the mode shapes, and subsequently to calculate what the response of the mass flow meter will be at other flow strengths.

If the modal properties of the pipe were determined at a mass flow that is not zero, it appears that this can significantly influence the calculated calibration factors. In a simulation example where the calibration factor would have to be 10.95 degrees per kg/sec for the phase offset and 0.168 degrees per kg/sec for the phase sensitivity, it appears that calculated calibration factors of, respectively, 10.11 degrees and 0.158 degrees per kg/sec are found if these are calculated with the modal parameters and mode shapes that follow from a standard modal analysis at a flow strength of 10 m/sec (corresponding to a mass flow of 88 kg/sec). The magnitude of the error depends on the specific configuration of the mass flow meter, and increases with increasing magnitude of the mass flow at which the modal analysis takes place. Therefore, for a result that is reliable under all circumstances in the use of the method according to the art of WO03/021205, measurement of the modal properties of the pipe in the absence of mass flow is necessary.

The normal operation of existing pipe systems must therefore be interrupted to be able to use the Coriolis mass flow meter whilst calibrated. Further, such a calibration is sensitive to changes of the properties of the pipe used, for instance through temperature variations or wear, which may necessitate repeated interruptions of the normal operation for recalibration.

SUMMARY OF THE INVENTION

It is one object of the invention to provide an implicit or explicit in process calibration of a Coriolis force mass flow meter for implicitly or explicitly determining one or more calibration factors while an unknown mass flow flows through the pipe.

It is another object of the invention to provide a method for determining a mass flow and a Coriolis mass flow meter which are capable of determining an unknown mass flow through a pipe in an absolute sense without needing calibration factors that can only be determined by interrupting or changing a normal flow through the pipe.

It is a further object of the invention to make such provisions specifically for a clamp-on Coriolis mass flow meter.

The invention provides a method according to claim 1. According to this method, a needed calibration factor of a pipe is determined in process while a mass flow assumed to be unknown flows through the pipe. The calibration factor is determined explicitly or implicitly, that is to say that the calibration factor or at least model parameters that govern the calibration factor are determined. The mass flow is preferably determined from the same measurements (made while the mass flow runs through the pipe) from which also the calibration factor and/or model parameters that govern the calibration factor are determined. In the above-mentioned simulation example, this results in calibration factors of 10.90 degrees and 0.167 degrees per kg/sec calculated for the phase offset and the phase sensitivity, respectively, which agrees better with the real calibration factors.

The determination of the calibration factor is done with the aid of a model for the behavior of the pipe, which, in addition to the mass flow, has a number of model parameters of the mechanical behavior of the pipe as free parameters. The pipe is excited at different frequencies, while the magnitude of the excitation forces and/or moments is determined as well as the resultant response of the pipe. Response is here understood to mean the deflection and/or twist (also called "rotation") of any pipe segment in any direction, a first or higher order time derivative thereof, or a phase and amplitude of a frequency response of one of these quantities. From the combination of the excitation force and/or moment and the response thereby generated for the different frequencies, the model parameters, including the unknown mass flow, are estimated and, possibly implicitly, used for the calculation of one or more calibration factors (the measurements can comprise both amplitude and phase measurements).

In one embodiment, the pipe is excited in several different vibration modes by means of excitation with a frequency at or near the resonance frequency of the respective vibration modes, and the mode shape and parameters of a frequency response of each of the vibration modes are estimated. From this follows the coupling strength with which the Coriolis force upon excitation in one vibration mode generates response patterns in other vibration modes, so that on the basis of measurements on those response patterns the mass flow can be calculated.

BRIEF DESCRIPTION OF THE DRAWINGS

These and other objects and advantageous aspects of the invention will be further described with reference to the following figures.

DETAILED DESCRIPTION OF THE DRAWINGS

Figure 1:
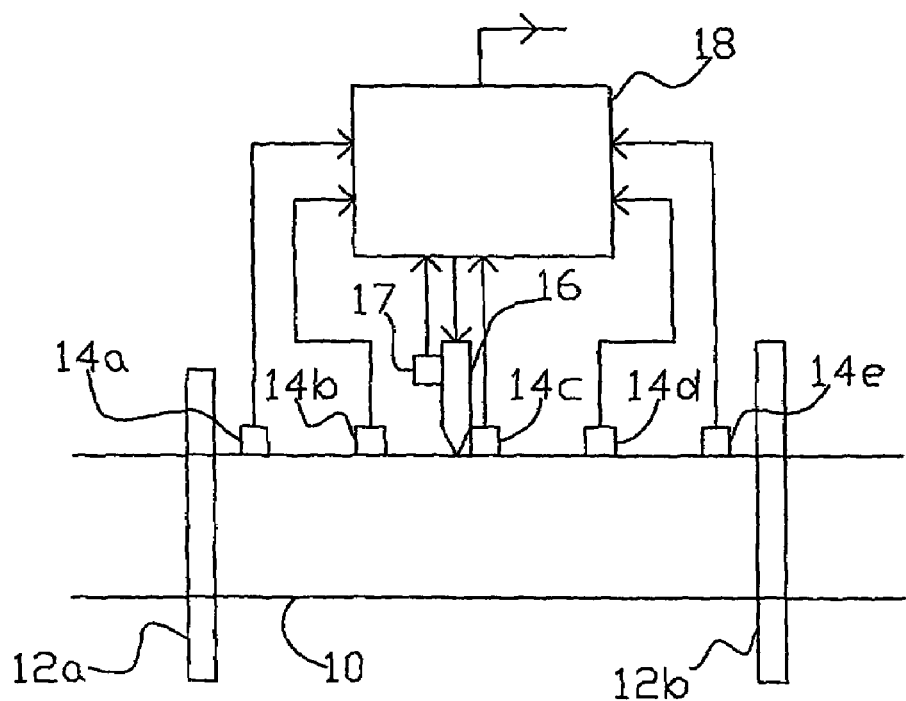
FIG. 1 shows a mass flow meter

FIG. 1 shows a mass flow meter provided with a pipe 10, clamping elements 12a, 12b, with which pipe 10 is clamped at two positions, sensors 14a-e which are coupled to pipe 10 at an axial series of positions between clamping elements 12a,b, an exciter 16, a force sensor 17 and a processing circuit 18 which is coupled to the sensors 14a-e, 17 and the exciter.

In operation, liquid flows through pipe 10 and the wall of pipe 10 is vibrated transversely to the direction of flow with exciter 16 which exerts a time t dependent Fe(t) on the pipe wall at a position x0 along an imaginary x-axis which coincides with the direction of flow of pipe 10. In FIG. 1, by way of example, an exciter is shown which exerts a force on a point, but use can also be made of several exciters, or an exciter which exerts a couple N, for instance by means of a pair of mutually opposite forces N/d, −N/d on two closely spaced points on the pipe at a mutual distance d. Also possible are combinations of forces and couples. As a result of the force and/or the couple, the pipe 10 curves, whereby pipe 10 obtains as a function a deflection u(x,t) transverse to the x-axis as a function of the position x along the x-axis.

In contrast with conventional Coriolis mass flow meters, in which the excitation is done in the nodes (zero points of the mode shapes) of particular modes, exciter 16 is preferably so arranged as to transmit the force onto pipe 10 at a position outside the nodes of a number of relevant (low order) modes, so that all these modes can be excited with exciter 16.

The deflection u(x,t) is dependent on the elastic parameters of pipe 10, the effect of clamping elements 12a,b and a so-called Coriolis force Fc, which is continuously distributed over the pipe and is dependent on the time and space derivative of the deflection u(x,t):

$$Fc(x)=2Q\ d^2u/dxdt$$

wherein Q is the mass flow through pipe 10 (for instance in kg/sec), and Fc dx is the total Coriolis force exerted on the pipe over a length dx. The deflection is a response of pipe 10 to the sum force distribution Ft $$Ft(x)=Fe(x)+Fc(x)$$

of the force Fe which is exerted by exciter 16 as a function of place and time and the generated Coriolis force Fc as a function of place and time. Q is determined in process on the basis of the effect thereof on the deflections u(x,t). Here, use is made of a vibration model of pipe 10 in which a number of free parameters are determined, likewise in process (in the presence of an unknown mass flow Q).

An example of a vibration model assumes that the vibrations of pipe 10 can be described as a composite of a number of modes each having virtually a second order resonance behavior. When pipe 10 is excited with a periodic force distribution Fe=Ae(x)*exp(iωt) of frequency ω, with Fe dx being the total excitation force exerted on the pipe over a length dx, the deflection u(x,t) can be a linear combination of a number of different mode shapes sm(x):

$$u(x,t)=\Sigma B_m s_m(x)\exp(i\omega t) \quad (1)$$

The sum is taken over a number of values m that distinguish different modes. In the case of a second order resonance behavior, the frequency dependence by which the excitation factor Bm depends on the total force distribution Ft=At(x) exp(iωt) on pipe 10 can be described with a limited number of free parameters:

$$B_m=D_m/(k_m+ig_m\omega-M_m\omega^2),\text{ wherein }D_m=\int dx\ At(x)s_m(x)$$

The free parameters are here the numbers km, gm and Mm, which determine the vibration frequency and damping factor of the mode m, as well as the stiffness of the reaction to forces. (The result of the model does not change if sm(x) is multiplied by a factor while km, gm and Mm are multiplied by the square of the same factor. For that reason, it may be assumed without restriction that sm(x) is normalized in some manner or other).

The excitation factor Bm describes the amplitude and phase with which the mode shape sm(x) resulting from a particular mode is represented. In practice, the factors Bm of the modes of the lowest orders, that is, the modes with the lowest resonance frequencies, appear to be generally much greater than the factors Bm for higher order modes. The factor At(x) which comprises the exerted forces, includes the sum of contributions Ae(x), Ac(x) of the excitation force Fe and the Coriolis force Fc. The Coriolis force is exerted on a range of positions. When the excitation force Fe is exerted at or around a single position X0, with a magnitude briefly written as "Ae" (which is measured with sensor 17, or determined by the drive of actuator 16; in principle, Ae also contains a phase factor, but by measuring all other quantities in a relative manner with respect to the phase of Ae, the phase can be set at zero), the factor Dm is a sum of the effect of these forces.

$$D_m = Ae\, s_m(x0) + 2i\omega Q \Sigma_{m'} B_{m'} \int dx\, s_m(x)(ds_{m'}(x)/dx)$$

This formula holds for excitation with displacement forces alone. In the case where exciter 16 generates a moment Ne (mutually opposite forces Fe=+−Ne/d at mutually close positions at a mutual distance d on pipe 10), Ne $s_{m'}(x0)$ needs to be added to the first term (with $s_{m'}$ being the derivative of $s_m$ to x).

According to one embodiment of the invention, a model such as the above is used to determine the mass flow Q from measurements on the response of the pipe, such as, for instance, the deflections "u", at different positions along pipe 10 at different excitation frequencies. Preferably, use is then made of a least squares technique, whereby the parameters, including Q, the mode shapes and the parameters km, gm, Mm are chosen for a number of different modes, such that a sum of the squares of the deviations between the measured response and the response predicted according to the above equations is minimized. Instead of using a least squares technique, the parameters, including Q, can also be estimated directly from the measurements.

The above equation can be expressed in matrix form, $$D = P\, Ae + 2i\omega Q\, R\, B$$

with vectors D and B which have Dm and Bm as components, and a vector P and a matrix R having as components $$P_m = s_m(x0)$$

$$R_{mm'} = \int dx\, s_m(x)(ds_{m'}(x)/dx)$$

It may be noted here that the matrix R, given perfect clamping, is antisymmetrical ($R_{mm'} = -R_{m'm}$). If in addition use is made of diagonal matrices k, g, M with on the diagonal the parameters km, gm, Mm for the different modes, then it follows for the factors B $$B = (k + ig\omega - M\omega^2 - 2i\omega Q\, R)^{-1} P\, Ae \quad (2)$$

This formula describes the effect of the mass flow Q on the factors Bm by which the modes contribute to the deflection u in response to an excitation force Ae. A mass flow Q thus has effect on the observable deflections.

In practice, the disturbance by the mass flow Q is mostly relatively small. In this case, use can be made of a first order approximation, wherein $$B_m = (k_m + ig_m\omega - M_m\omega^2)^{-1} P_m Ae - 2i\omega Q(k_m + ig_m\omega - M_m\omega^2)^{-1} \Sigma_{m'} R_{mm'}(k_{m'} + ig_{m'}\omega - M_{m'}\omega^2)^{-1} P_{m'} Ae$$

Thus, the observable deflection is defined according to $$u(x,t) = \Sigma B_m s_m(x) \exp(i\omega t)$$

Upon excitation of pipe 10 with forces and/or moments with a frequency $\omega$ around the resonance frequency $\omega_o$ of a mode $m_o$ (where $(k_{mo} + ig_{mo}\omega - M_{mo}\omega^2)$ is small), the observable deflection includes a component G which is by approximation independent of the excitation frequency, as well as a component H which changes strongly with changing excitation frequency:

$$B_m = G_m(\omega_o) + H_m(\omega)$$

For the excitation factor $Bm_o$ of the resonant mode, the strongly changeable component $Hm_o$ can be described by approximation by $$H_{mo} = (k_{mo} + ig_{mo}\omega - M_{mo}\omega^2)^{-1} P_{mo} Ae - 2i\omega Q(k_{mo} + ig_{mo}\omega - M_{mo}\omega^2)^{-1} \Sigma_{m'} R_{mom'}(k_{m'} - M_{m'}\omega^2)^{-1} P_{m'} Ae$$

For the excitation factors of the other modes $m \neq m_o$ (not resonant at the respective frequency), it holds by approximation that the independent component around resonance of the mode $m_o$ satisfies $$G_m = (k_m - M_m\omega_o^2)^{-1} P_m Ae$$

and that the strongly changeable component satisfies $$H_m = -2i\omega_o Q(k_m - M_m\omega_o^2)^{-1} R_{mmo}(k_{mo} + ig_{mo}\omega - M_{mo}\omega^2)^{-1} P_{mo} Ae$$

The changeable component of each mode therefore comprises a strongly frequency-dependent factor $(k_{mo} + ig_{mo}\omega - M_{mo}\omega^2)^{-1}$, as well as a phase factor which can be described for the resonant mode with $$P_{mo} Ae - 2i\omega_o Q \Sigma_{m'} R_{mom'}(k_{m'} - M_{m'}\omega_o^2)^{-1} P_{m'} Ae$$

and for the non-resonant modes with:

$$-2i\omega_o Q(k_m - M_m\omega_o^2)^{-1} R_{mmo} P_{mo} Ae$$

These excitation factors determine the observable deflections $\Sigma B_m s_m(x) \exp(i\omega t)$. The strongly changeable part of these deflections therefore includes the strongly frequency-dependent factor that is the same for each sensor position x and further a phase factor, which for each position x is a sum of the phase factors of the excitation coefficients for the different modes, weighted with the mode shapes of the respective modes at the location of the respective sensor position. The real part of this phase factor is the real part of the phase factor of the excitation coefficient of the resonant mode, weighted with the mode shape of this resonant mode.

By measuring the deflections at different frequencies around the resonance frequency, the parameters of the strongly frequency-dependent factor $(k_{mo} + ig_{mo}\omega - M_{mo}\omega^2)^{-1}$ can be determined, as well as the phase factors of the deflection for different sensor positions. From the manner in which the real part of the phase factor depends on the position of the sensor on pipe 10 then follows the mode shape of the resonant mode (which, as mentioned earlier, is normalized according to any convention).

In this way, the parameters of the strongly frequency-dependent factors and the mode shapes of all modes involved can be determined. With the aid of the mode shapes found, next, the imaginary $I_{mo}(x)$ of the phase factors measured at excitation with a frequency around the resonant frequency of a mode $m_o$ as a function of the sensor position can be resolved into components in the form of the different mode shapes $$I_{mo}(x) = \Sigma \alpha_{mom} s_m(x)$$

If the mode shapes are orthogonal, a resolution coefficient $\alpha_{mom}$ can be calculated from $\int dx\, I_{mo}(x) s_m(x)$. In this case, an estimation of the mode shape of a single mode suffices to determine the coefficient $\alpha_{mom}$ as far as $I_{mo}(x)$ is sufficiently known. In general, the coefficients can be determined by resolving them from an array of equations of the above type, obtained from measurements of $I_{mo}(x)$ at different positions x.

From each coefficient $\alpha_{mom}$, with the aid of the already determined parameters $k_m$ and $M_m$ from the frequency-dependent factors, the term $Q R_{mm'}P_{m'}$ can be estimated. The components $R_{mm'}$ of the coupling matrix R and $P_{m'}$ of the vector P can be calculated from the mode shapes by means of interpolation. Here, the respective integral expression for R can be estimated with any technique for calculating integrals on the basis of values of the mode shapes at a number of positions along pipe 10. Thus, it is possible to estimate Q.

$$Q = -\alpha_{mom}(k_m - M_m\omega_o^2)/(2i\omega_o R_{mmo}P_{mo}Ae)$$

If desired, use can be made of the fact that the matrix R is antisymmetrical. In this case, the reciprocal couplings $\alpha_{mm'}$ $\alpha_{m'm}$ between two modes are estimated, for instance by exciting with frequencies around the resonance frequencies of the two modes involved and estimating the coupling at each frequency from the generated component of the non-resonant mode. Next, the mass flow is estimated from $$Q = \{(k_m - M_m\omega_m^2)\alpha_{m'm}/(2i\omega_m P_{m'}Ae') - (k_{m'} - M_{m'}\omega_{m'}^2)\alpha_{mm'}/(2i\omega_{m'}P_m Ae)\}/(2*R_{m'm}).$$

($\omega_m$ and $\omega_{m'}$ are the resonance frequencies of the modes involved, and Ae and Ae' are the magnitudes of the forces involved). Thus, disturbing effects are eliminated of other couplings, which are not antisymmetrical.

If pipe 10 is mirror-symmetrical around a central point between the clampings, and if the clamping is also symmetrical, the mode shapes are even or odd around this center point. In this case, the mass flow couples even and odd modes, but not even modes mutually, or odd modes mutually. Therefore, preferably, the coupling between an even and an odd mode is used to determine the mass flow.

Summarizing, it thus appears that the mass flow can be determined from the component of the measured deflections that has the shape of a particular mode shape, upon excitation with forces and/or moments with a frequency around a resonance frequency. Preferably, the component of the deflections having the mode shape of a mode other than the resonant mode is used for this purpose. For this determination, an estimation of the mode shapes of at least the resonant mode and the mode on which the deflection has been measured is needed, and further the resonance parameters k, g, M of at least two modes are needed (or other parameters governing the strong frequency-dependence). The mode shapes and the resonant parameters are determined by measuring with excitation forces and/or moments with frequencies around the resonance frequencies of the different modes involved.

In the above, the principle of the estimation of the modal pipe properties and the mass flow Q has been made explicit for cases where the flow has only a slight effect on the pipe response. For a more accurate in process estimate of the relevant parameters, however, use must be made of an implicit calculation, such as a least squares technique. For this, measurements on the deflections (or velocities, or accelerations or place-derivatives thereof) are used upon excitation with signals that comprise spectral components around at least two different resonance frequencies, which measurements are compared with the outcomes of the model as described in equations (1) and (2). The relevant parameters of this model, viz. the mass flow Q and the elements of the matrices k, g and M in equation (2) as well as the value of the mode shapes sm(x) at the sensor positions in equation (1), are so adjusted that the outcomes of the model agree as best as possible with the measurements. In this way, the model pipe parameters and the mass flow can be determined in process.

Figure 2:
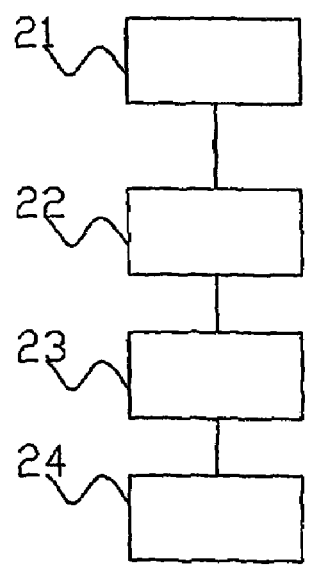
FIG. 2 shows a flow chart for determining a mass flow

FIG. 2 shows a flow chart of an embodiment of a method with which processing circuit 18 determines the mass flow Q. In a first step 21, the measuring process is started. In a second step 22, processing circuit 18 drives exciter 16 such that it exerts force on pipe 10. Processing circuit 18 records the magnitude of this force on the basis of signals from force sensor 17.

In a third step 23, processing circuit 18 records the deflection u(x,t) at a number of positions xi (i=0, 1, . . . ) on the basis of signals from sensors 14a-e. Next, processing circuit 18 performs a fourth step 24, in which it calculates the mass flow Q from the measured deflections u(xi,t) and the measured force.

The effect of the elastic parameters is thereby eliminated in process, that is, from measurements performed while an initially unknown mass flow Q flows through pipe 10.

In one embodiment, processing circuit 18 chooses the measuring frequencies near the resonance frequencies of a number of different modes. Preferably, processing circuit 18 is arranged to search for these resonance frequencies, for instance by performing a frequency sweep and detecting around which frequencies the response peaks, or by measuring for a large number of different frequencies how great the response is, or by determining the peaks in a spectral analysis of the response to a pulse excitation.

In principle, it suffices to measure at so many frequencies and positions that at least as many equations are generated as there are free parameters (including Q), but processing circuit 18 preferably makes use of measurements for so large a number of frequencies that the array gets overdetermined. In that case, use can be made of a least squares technique, known per se, to resolve the combination of free parameters and mass flow Q that predicts the measured deflections with the least error.

Resolving does not require that the free parameters of the model be calculated first, and then the mass flow Q on the basis of the first calculated parameters. In principle, the mass flow Q and the free parameters can be resolved jointly, for instance with a common minimization of the error.

Generally, the mass flow will change faster than the free parameters. Therefore, in a series of measurements of different mass flows, what may also suffice is a single determination of the free parameters, which is subsequently used for a series of different calculations of the mass flow Q at different moments. Effectively, in this way, from a single measurement, calibration factors for other measurements are calculated. Further, values of the free parameters determined earlier can be used as initial values in an iterative resolution of the free parameters and/or the mass flow.

In the embodiment of FIG. 1, the excitation force is measured with force sensor 17, but it will be clear that such a sensor is not necessary when use is made of a calibrated exciter 16 which at a given amplitude driven by processing unit 18 generates a predictable force. Further, it will be clear that the force will generally be measured indirectly, for instance by measuring the elastic deformation of an exciting transmission, for instance with a strain gauge, and calculating the force from a known relation between deformation and force. Also, for instance, the force can be exerted with a known moving mass, using an acceleration sensor to measure the force.

Further, it will be clear that although the model is described in terms of deflection measurements u, it is also possible to use measurements of the velocities (v(x,t)=du/dt) or accelerations (dv/dt) of different locations on pipe 10. This is a matter of a frequency factor in the formulae used. Use can also be made of a model and corresponding measurements, whereby the model describes the response of the pipe in terms of the rotation of a pipe segment, or in terms of deflections and/or rotations in several different directions of movement, or in terms of a first or higher order time derivative of one of these quantities.

In the embodiment described, the excitation forces of different frequencies are generated in succession, whereby in succession time periodic forces of a different frequency are generated. Next, the amplitude and phase of the deflections at different positions along pipe 10 are measured. But it will be clear that the excitation can also be generated with a part or all of the frequencies simultaneously, for instance by using pulse excitation, or a linear combination of a limited number of time periodic signals of different frequencies. The response to different frequencies can subsequently be derived by means of a Fourier transform, or by filtering from the measured deflections u(x,t).

Further, it will be clear that for obtaining a sufficient or more than sufficient number of equations for resolving Q, what can also be used, in addition to (or instead of a sufficiently large number of frequencies and positions xi, is independent excitation at several positions x along pipe 10, or combinations of displacement excitations and moment excitations. Thus, the distinction between different modes can be realized with different place-dependent excitations, partly or wholly instead of with different frequencies. The measured deflections in response to each of these excitations, or to linearly independent combinations of such excitations, furnish a number of independent equations for the parameters and the mass flow Q.

In the foregoing, the invention has been described in terms of a technique in which the parameters and mode shapes of different resonance modes are estimated. However, the invention is not limited thereto. Instead of a model in terms of vibration modes, other kinds of models can be used, such as, for instance, a model in terms of differential equations. A simple example of such a model in the frequency domain utilizes the following equations:

$$\frac{du(x)}{dx} = \phi(x)$$

$$\frac{d\phi(x)}{dx} = \frac{1}{k(x)}M(x)$$

$$\frac{dM(x)}{dx} = -F(x) - M_{ext}(x, \omega)$$

$$\frac{dF(x)}{dx} = -m(x)\omega^2 u(x) + 2i\omega Q\phi(x) - F_{ext}(x, \omega)$$

wherein
m(x) is the total axial mass distribution of pipe+medium;
k(x) is the local bending strength;
Q is the mass flow;
$F_{ext}(x,\omega)$ and $M_{ext}(x,\omega)$ are the distribution of the transverse forces and moments, respectively, acting externally on the pipe.

From such a model, in a manner known per se, given the forces and moments $F_{ext}(x,\omega)$ and Mext(x,$\omega$) and the model parameters m(x), k(x) and Q, the deflections u can be calculated. To this end, use can be made, for instance, of known simulation techniques, or resolution techniques for differential equations.

With these, Q can be estimated by measuring the pipe response and the forces and/or moments at a number of points, and by utilizing a least squares technique which estimates the parameters Q, m(x) and k(x) minimizing a sum of the squares of the deviations between the calculations and the measurements (here, m(x) and k(x) may be complex parameters, whose imaginary part can describe for instance the influence of damping). The functions m(x) and k(x) are then preferably parameterized, for instance by means of a number of coefficients of polynomials P(x) with which these functions are approximated. In this case, these coefficients are estimated with the least squares method.

In principle, such an approach yields the same effect as use of a vibration mode model, in which the resonance parameters and mode shapes are estimated. The advantage of the use of a differential model, however, is that with this model, by the parameters m(x), k(x) the dynamic behavior of the clamped pipe section under the influence of external forces is in principle defined completely, also, for instance, for frequencies that are higher than the highest frequency at which measuring was done.

Naturally, the invention is not limited to the specific differential model described hereinabove. More extensive models can be found, for instance, in C. A. F. De Jong, '*Analysis of pulsations and vibrations in fluid-filled pipe systems*' (PhD Thesis, ISBN 90-386-0074-7). TNO Institute of Applied Physics, Delft, 1994, by G. Sultan and J. Hemp, 'Modelling of the Coriolis mass flow meter', *Journal of Sound and Vibration* 132(3), 473-489 (1989). Thus, in the model, for instance a term for the local friction damping g(x)i$\omega$u(x) can be added to the equation for dF/dx. If the pipe diameter is greater than approximately ⅙ of the wavelength of the bending waves generated in the pipe, it is preferred to add terms that represent the local shear strength G(x) of the pipe, and the axial distribution of the mass inertia moment of a pipe slice for transverse rotation, I(x). It is then necessary to add to the equation for dF/dx the term 1/g(x)·2i$\omega$QF(x), to the equation for dM/dx the term $-I(x)\omega^2\phi(x)$, and to the equation for du/dx the term 1/G(x)·F(x).

Thus, according to need, any model can be used which includes the needed parameters for describing the behavior of pipe 10. This model is subsequently used for in process estimation of the mass flow and the relevant parameters of the model.

Although in FIG. 1 a straight pipe 10 of constant diameter is shown, it will be clear that the invention is not limited to such pipes. The models used can also be applied to pipes of a different shape, for instance to a pipe making a bend or a pipe whose thickness changes as a function of the position. As an adjustable model is used, the determination of the mass flow Q is not dependent on that.

In the use of perfect clamping elements 12a,b, the generated vibrations in pipe 10 only occur between clamping elements 12a,b and not outside them. On the other hand, given perfect clamping, external forces acting on the pipe at or beyond the clamping elements do not have any influence on the response of the pipe section between the clamping elements. In this case, the vibration model does not need to include any extrapolation of the mode shapes beyond the clamping elements, and what can be taken as a precondition for the differential equations is that the deflection and rotation on the clamping points is zero.

In the case of less good clamping, pipe 10 is also vibrated outside the clamping points, so that, there too, Coriolis forces may be generated that can contribute to the measured deflections between the clamping points. This effect, as well as the effect of other (reaction) forces and/or moments, whether or not generated by vibration, that are exerted on the pipe outside a range between the clamping points with the same frequency as the excitation frequency, can be described, in the case of less good clamping, with a disturbance by forces and/or moments that are exerted on the pipe at the clamping elements. It may happen that such external forces influence the response of the pipe section between the clamping elements. Therefore, it is preferred for the model to incorporate disturbances by forces and/or moments which are exerted at clamping elements $12a,b$. In the vibration model, this is done, for instance, by $$D_m = P_{0m}A_0(\omega) + P_{Lm}A_L(\omega) + P_m Ae + 2i\omega Q\, R_{mm'}B_{m'}$$

with $P_{0m} = s_m(0)$, $P_{Lm} = s_m(L)$ in the case of forces and $P_{0m} = s'_m(0)$, $P_{Lm} = s'_m(L)$ in the case of moments, and $A_0(\omega)$, $A_L(\omega)$ being the magnitude (and phase) of the disturbing forces and/or moments exerted at the location of clamping elements at the different measuring frequencies (naturally, terms for forces and moments can also be added up).

These forces and/or moments $A_0(\omega)$, $A_L(\omega)$ form free parameters in the model. By for instance measuring the response at a sufficiently large number of positions xi on the pipe, it is rendered possible, besides the earlier-mentioned parameters of the model, to resolve also these parameters for every frequency at which measuring was done.

When using clamping elements $12a,b$ which properly fix the position of pipe 10 on the clamping points but do not, or hardly so, prevent rotation of pipe 10, especially the moment exerted at the location of the clamping elements $12a,b$ is relevant for the pipe response between clamping elements $12a,b$. In such an embodiment, only the respective disturbing moments on the clamping points are treated as free parameters and the disturbing forces are set at zero.

The disturbing forces and/or moments that apply at the location of the clamping points can cause relatively large deflections of the pipe in the direct proximity of the clamping points. However, because lower order modes exhibit a relatively slight deflection at the clamping points, the effect of the forces and/or moments applying at the clamping points cannot be accurately described with these lower modes alone. Therefore, the processing circuit 18 preferably determines the parameters of more than two modes (not only for a mode with which pipe 10 is substantially excited and the mode in which the Coriolis force substantially excites in the range between clamping elements $12a,b$). Thus, the effect of the disturbing forces and/or moments applying at the clamping points is incorporated more accurately.

Also when using a differential model, the forces and/or moments on the clamping points can be incorporated as adjustable free parameters, for instance by modeling these as a component of the transverse forces and moments, respectively, acting externally on the pipe. The use of a differential model here has the advantage that given a relatively homogeneous pipe a response resulting from forces and/or moments on the clamping points can be calculated directly from the differential equations, without this requiring measuring at the resonance frequencies of a large number of higher modes.

In a further embodiment, the apparatus is provided with further sensors at the location of or in the proximity of clamping elements $12a,b$ for a more accurate determination of the effect of imperfect clamping.

Especially the determination of the rotation of the pipe is advantageous here.

To obtain a proper clamping, the pipe, at the clamping points, can be clamped to external mounting points, which need to be sufficiently strong to take up the transverse forces and moments generated on the clamping points. It may happen, however, that such mounting points, while being strong enough to take up the transverse forces, are not rotation-stiff enough to compensate the transverse moments sufficiently.

Figure 5:
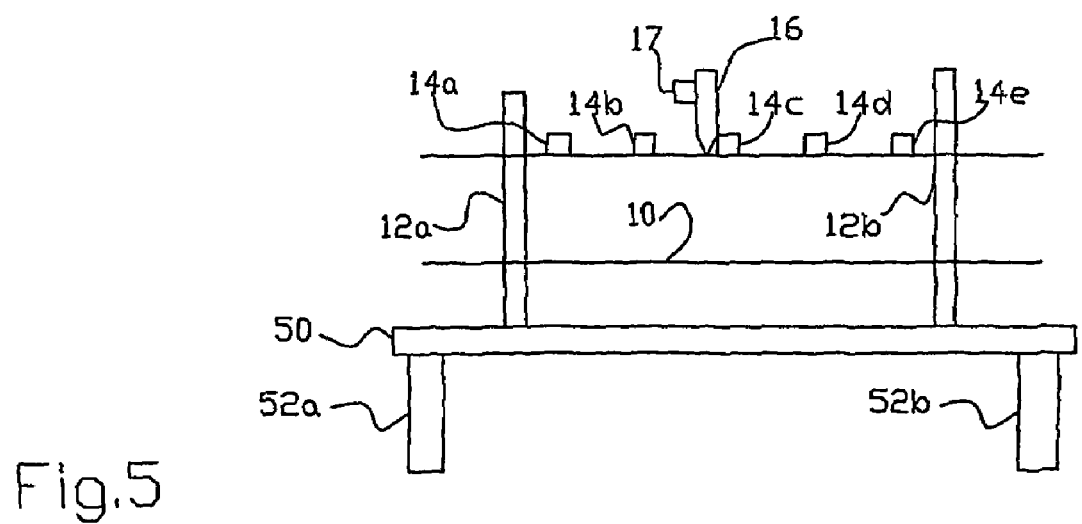
FIG. 5 shows a pipe with a frame between the clampings

FIG. 5 shows an embodiment in which clamping elements $12a,b$ are connected by means of a stiff external frame 50 which is mounted to pipe 10 with clamping elements $12a,b$ (which can be an integral part of frame 50) at the two clamping points, but which otherwise leaves the pipe clear.

Frame 50 takes up the transverse moments generated in the two clamping points, insofar as they are opposite to each other. Mounts $52a,b$ affix frame 50 to the environment (not shown). Mounts $52a,b$ take up the transverse forces transmitted to the frame. Preferably, the frame is attached to at least two external mounting points, preferably at the ends of the frame, but use can also be made of a single mount at one point or more than two mounts. The advantage of frame 50 is that the transverse moment that is now exerted via mounts $52a,b$, can be much smaller than when no frame is used, because the opposed components of the transverse moments in the two clamping points are taken up by the frame, and substantially not via mounts $52a,b$ and because any residual transverse moment can be taken up by the external mounts $52a,b$ by means of opposed transverse forces transmitted to the ends of frame 50.

Figure 3:
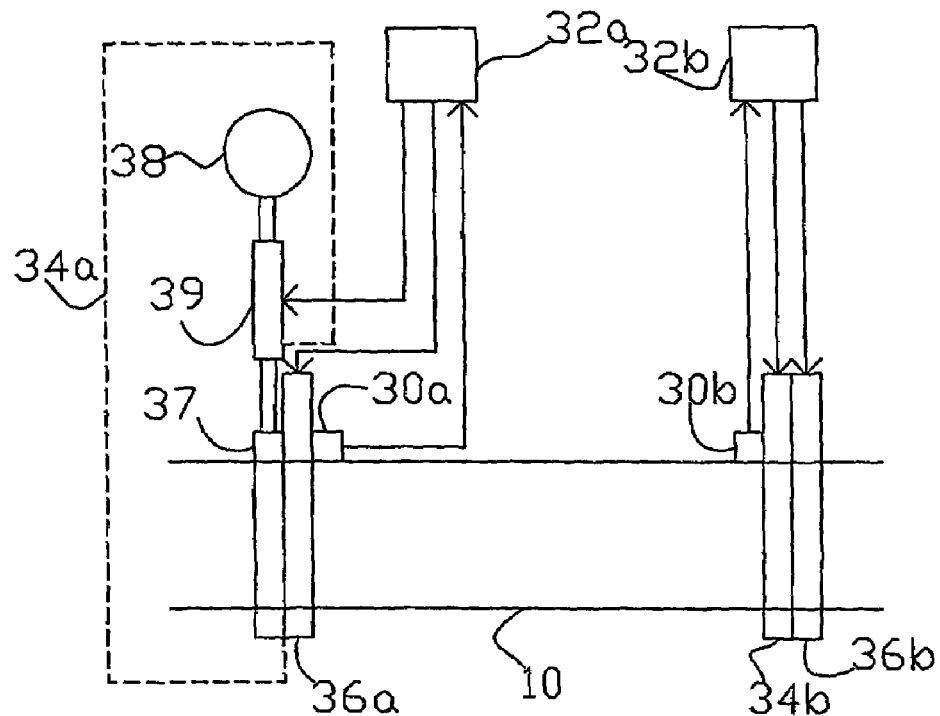
FIG. 3 shows a pipe with active clamping

FIG. 3 shows a pipe 10 having active clampings thereon. The active clampings comprise sensors $30a,b$ for the rotation (of an imaginary slice transversely out of pipe 10, for instance rotating about an axis transverse to the axis of pipe 10) from the displacements of the arms of a T-shaped element with the aid of a T-piece) and/or deflection of pipe 10, control circuits $32a,b$ and actuators $34a,b$, $36a,b$ which are coupled to pipe 10 at the location of, or as a replacement of, the clamping. The sensors $30a,b$ of a clamping point have an output which is coupled to the respective control circuit $32a,b$ for the clamping point, and the control circuit $32a,b$ has outputs which are coupled to the actuators $34a,b$, $36a,b$ for the clamping point.

One of the actuators $34a$ has been elaborated by way of example, in the form of a clamping element 37 which is mounted on pipe 10, a seismic mass 38 and connecting element 39 with which seismic mass 38 is coupled to clamping element 37. Connecting element 39 is controlled by control circuit $32a$, to exert a controllable force between seismic mass 38 and clamping element 37, for instance by means of an electromagnet or a piezoelectric structure. The other actuators $34b$, $36a,b$ can in principle be designed in the same way.

In operation, sensors $30a,b$ measure the rotation and/or displacement (or time derivatives thereof) of pipe 10 at the clamping points. Control circuits $32a,b$ receive the sensor signals and control the transverse forces and/or moments that are exerted with actuators $34a,b$, $36a,b$ on or near the clamping points on pipe 10. The control is so designed that the displacement and/or rotation at the clamping points is controlled to a particular desired value.

Instead of actuators with seismic masses 38, use can be made of actuators that are connected between pipe 10 and an external point, and exert forces to reduce and to enlarge the length of the connection. As shown, in each case a pair of actuators exert forces on a single clamping point along the same direction. If desired, additional actuators may be arranged to exert forces along a second direction transverse to the earlier-mentioned direction. This is useful especially if the construction of pipe 10 is such that couplings arise between vibrations in both directions.

For exerting transverse moments, use can be made of pairs of such actuators which apply at mutually neighboring positions on pipe 10, or of actuators which apply at such neighboring positions on pipe 10 and exert mutually opposed forces on these positions.

Figure 4:
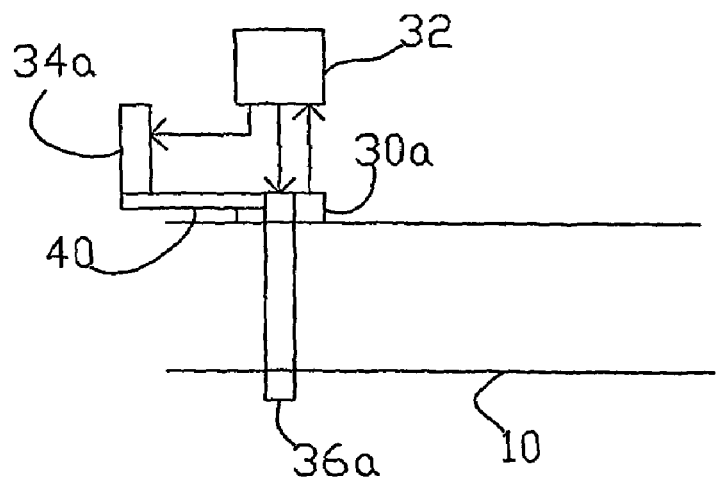
FIG. 4 shows a pipe with a further active clamping

FIG. 4 shows an actuator 34a which is coupled to pipe 10 over a particular length with a lever 40. In this embodiment, the moment is exerted by means of lever 40.

By way of example, both the displacement and the rotation are controlled. In this case, sensor 30a,b will have to be designed such that both. are measured on a clamping point. In another embodiment, only one of the rotation and the displacement is controlled. In that case, per clamping point, only one sensor for the quantity in question is needed, and one actuator. Thus, it is possible, for instance, to prevent rotation of the pipe adjacent the clamping points relative to each other by the use of the frame described earlier. The displacement and the rotation of the frame as a whole can subsequently be controlled by controlling only the displacements of the two ends of the frame. In this case, preferably, only an active control of the displacement is used.

Active clamping is advantageous in itself in Coriolis mass flow meters that are calibrated in a different manner (without estimating model parameters). Thus, for instance, disturbing influences from outside can be prevented. For this, an active clamping on one side can suffice, on the side where the disturbing influences come from. Further, active clamping generally has the advantage that no external mounting points for the pipe clamping are needed anymore. This is advantageous in situations where no, or only insufficiently strong, external mounting points are available, as will often be the case with pipes running at a great height above the ground.

Active clamping can also be advantageous under certain circumstances in an in process mass flow meter when it enables a reduction of the number of needed free parameters in the model used. This makes the estimation of the mass flow Q simpler. An active clamping on one side already reduces the number of free parameters. Further, if desired, the control circuit 32a,b can be adapted to apply a controlled deflection or rotation to the clamping points by way of excitation. The clamping thus serves as exciter. Also, the measured deflections and exerted forces can be used in the parameter estimation.

Although the invention has been described on the basis of specific embodiments, it will be clear that it is possible to deviate from the embodiments. Thus, for instance, instead of a least squares norm for the deviation between the measured response and the response according to a model, any other norm can be used.

The invention claimed is:

1. A method for determining a mass flow through a pipe, which method comprises the steps of:
    exerting a force and/or moment on at least one location on the pipe, such that vibrations of several vibration modes are excited in which the pipe exhibits deflections transverse to a direction of flow;
    determining a magnitude of the force and/or moment with which the pipe is excited;
    measuring responses of the pipe at multiple locations between two clamping points of the pipe, at excitations with several different frequencies while a mass flow assumed to be unknown flows through the pipe;
    implicitly or explicitly calculating a sensitivity of the response to the mass flow on the-basis of a model which comprises as free parameters the mass flow and in process estimated model parameters which determine the sensitivity, wherein the model parameters are estimated that correspond with the combination of the force and/or the moment and the responses measured for the different frequencies and an estimated mass flow of the model is adjusted to the force and/or moment and measured responses.

2. A method according to claim 1, wherein the mass flow is calculated from measurements of the response from which also the sensitivity is calculated.

3. A method according to claim 1, wherein the model provides for multiple vibration modes, each with a mode shape which describes a place-dependence of the response upon vibration in the mode involved and a frequency response function parameterized by the model parameters, which describes a dependency of excitation of the vibration mode on a time-dependency of the force or the moment, and wherein calculating the sensitivity comprises estimating the mode shapes and frequency response function of at least two of the vibration modes.

4. A method according to claim 3, wherein the frequencies for which the responses are determined comprise at least frequencies at or near resonance frequencies of the two vibration modes.

5. A method according to claim 4, which comprises the step of searching for the resonance frequencies and determining the responses at the resonance frequencies found.

6. A method according to claim 1, wherein the pipe responses are determined for more frequencies than is minimally required for estimating the model parameters and the mass flow, and wherein the model parameters and the mass flow are estimated through minimization of an error with which the estimated mass flow and the model parameters predict the pipe responses at the force and/or the moment.

7. A method according to claim 1, wherein the model comprises as a model parameter a force and/or moment with which an effect is modeled of forces that are exerted on the pipe outside a range between the clamping points.

8. A method according to claim 1, wherein the model provides at least one differential equation which describes the response, which differential equation comprises as free parameters the mass flow and a place-dependent mass and/or stiffness distribution of the pipe, and wherein calculating the sensitivity comprises estimating the place-dependent mass and/or stiffness distribution of the pipe, with which the at least one differential equation predicts responses in accordance with the measured responses.

9. A Coriolis mass flow meter provided with a pipe, clamping elements with which the pipe is clamped at two places, an excitation structure for exciting vibrations of the pipe transversely to a direction of flow through the pipe in several vibration modes of the pipe, multiple sensors for measuring responses of the pipe, a processing circuit for calculating a mass flow trough the pipe, which processing circuit is arranged to:
    determine a magnitude of a force and/or moment with which the excitation structure excites the pipe;
    implicitly or explicitly determine a sensitivity of the response to a mass flow, on the basis of a model which comprises as free parameters the mass flow and in process estimated model parameters that determine the sensitivity, wherein the model parameters are estimated that correspond with the combination of the responses and the force and/or the moment for different frequencies while a mass flow assumed to be unknown flows through the pipe and an estimated mass flow of the model is adjusted to the force and/or moment and measured responses.

10. A Coriolis mass flow meter according to claim 9, wherein the processing circuit is arranged to calculate the mass flow from measurements of the response from which also the sensitivity is calculated.

11. A Coriolis mass flow meter according to claim 9, provided with a frame with which the clamping elements are connected and an external mount which is mounted to the two clamping elements only via the frame.

12. A Coriolis mass flow meter according to claim 9, provided with an active clamping.

13. A Coriolis mass flow meter suitable for use when provided on a pipe, and provided with;

clamping elements to mount the pipe at two places, an exciter for exciting vibrations of the pipe transverse to a direction of flow through the pipe, multiple sensors for measuring responses of the pipe, a processing circuit for calculating a mass flow through the pipe, arranged to determine a magnitude of a force and/or moment with which the exciter excites the pipe;

wherein a sensitivity of the response to a mass flow is determined, for purposes of the processing circuit calculating the mass flow, on the basis of a model which comprises as free parameters the mass flow and in process estimated model parameters that determine the sensitivity, wherein the model parameters are estimated that correspond with the combination of the responses and the force and/or the moment for different frequencies at a mass flow assumed to be unknown and an estimated mass flow of the model is adjusted to the force and/or moment and measured responses.

14. A computer program product, comprising instructions of a program for programming a processing unit of a Coriolis mass flow meter, which instructions are arranged to cause a force and/or moment to be exerted on at least one location on the pipe, such that vibrations of several vibration modes are excited in which the pipe exhibits deflections transverse to a direction of flow;

determine a magnitude of a force and/or moment with which the pipe is excited;

receive measurements of responses of the pipe at multiple locations between two clamping points of the pipe, at excitations with several different frequencies while a mass flow assumed to be unknown flows through the pipe;

implicitly or explicitly calculate a sensitivity of the response to the mass flow on the basis of a model which comprises as free parameters the mass flow and model parameters which determine the sensitivity, wherein the model parameters are estimated that correspond with the combination of the force and/or the moment and the response measured for the different frequencies and an estimated mass flow of the model is adjusted to the force and/or moment and measured responses.

\* \* \* \* \*